United States Patent [19]

Kratzer

[11] 4,004,237

[45] Jan. 18, 1977

[54] SYSTEM FOR COMMUNICATION AND NAVIGATION

[75] Inventor: Dale L. Kratzer, Meford Lakes, N.J.

[73] Assignee: Harris Corporation, Cleveland, Ohio

[22] Filed: Aug. 20, 1973

[21] Appl. No.: 389,796

Related U.S. Application Data

[63] Continuation-in-part of Ser. No. 33,748, May 1, 1970, Pat. No. 3,755,816.

[52] U.S. Cl. .............................. 328/155; 328/72; 328/133
[51] Int. Cl.[2] .................. H04B 1/12; H03B 3/04
[58] Field of Search ............ 307/269; 328/63, 155, 328/72, 133

[56] References Cited

UNITED STATES PATENTS

| 3,160,821 | 12/1964 | Farrow | 328/155 |
| 3,163,823 | 12/1964 | Kellis et al. | 328/155 X |
| 3,181,122 | 4/1965 | Brown | 328/155 X |

Primary Examiner—John Zazworsky
Attorney, Agent, or Firm—Morton C. Jacobs

[57] ABSTRACT

A radio navigation and digital communication system is used for the transmission of navigation modulation and digital data. A modulation locked loop, which may be constructed with three channels, is used to develop synchronization signals for the digital data signals and to ensure a high level of communication reliability and accuracy of navigation measurement using pseudo random navigation code.

7 Claims, 11 Drawing Figures

SYSTEM FOR COMMUNICATION AND NAVIGATION

This application is a continuation-in-part of U.S. Pat. No. 3,755,816, issued Aug. 28, 1973, based on application Ser. No. 33,748, filed May 1, 1970, which describes a system for radio navigation measurements that uses a modulation code signal which may take various forms, such as a rectangular wave modulation. The disclosure of that application is incorporated herein by reference. Where more complex navigation codes such as pseudo random code are employed (e.g. for greater accuracy and to avoid ambiguities in global navigation), it has been found desirable to employ a modified form of modulation locked loop.

BACKGROUND OF THE INVENTION

This invention relates to a system for radio navigation and communication and which may be employed for either or both.

It has also been found that digital data modulation can be added to the navigation code modulation without increasing the energy requirements. Moreover, the navigation modulation may be used for developing synchronization signals for the digital modulation.

In radio communication systems for the transmission of digital data, synchronization bits are transmitted with the data for the achievement of frame and bit synchronization at the receiver. High power levels at each bit (e.g. to achieve a 12–14 db signal to noise ratio) are often needed to ensure recognition of the received synchronization bits. At lower power levels (e.g. 6 db), a failure to recognize the synchronization bits leads to loss of synchronization with the received data and substantial bit errors result. Thus, it has been found desirable to provide a synchronization system which is suitable at low power levels.

SUMMARY OF THE INVENTION

It is among the objects of this invention to provide a new and improved radio navigation system Another object is to provide a new and improved communication system.

Another object is to provide a new and improved synchronization system for digital communication.

Another object is to provide a new and improved combined radio navigation and digital communication system.

Another object is to provide a new and improved modulation locked loop for a radio communication system.

In accordance with one embodiment of this invention, a radio navigation receiver operates to correlate a navigation code generated by the receiver with a similar navigation code forming the modulation of the transmitted signal. A digital data signal is transmitted in addition to the navigation code signal as an additional modulation, and the two modulation signals are in synchronism. A modulation locked loop in the receiver employs three channels, one of which receives the navigation code to be locked in phase with the transmitted navigation code and the others of which respectively receive the navigation code phase-displaced from the reference code by a half bit in advance of and behind that reference code. The difference between the navigation codes in the phase-displaced channels is obtained and the difference signal is combined with the reference signal in a balanced phase detector to develop an error signal which is used to control the phase of the navigation code in the reference channel, as well as in the other channels. In the condition of correlation (or phase lock) in the reference channel, the reference channel has a peak signal and the difference signal is zero. Upon the phase adjustment of the navigation code to achieve phase lock, measurements of the distance from the transmitter of a mobile craft bearing the receiver are made.

The digital modulation is phase related to the navigation code modulation and the establishment of phase lock on the navigation code is also used for generating a synchronization signal for a digital frame or word of the digital modulation. The phase adjustment of the local code generator of the receiver likewise provides an adjustment of the local digital sampling signals for synchronizing the sampling of the digital data. In addition, matched filter detection can be approached with the accurate synchronization of the data sampling signals to the data. That is, the data signal can be sampled by the synchronized sampling signal when the peak response of the data signal is a substantial maximum with respect to the average noise output.

BRIEF DESCRIPTION OF THE DRAWING

The foregoing and other objects of this invention, the various features thereof, as well as the invention itself, may be more readily understood from the following description when read together with the accompanying drawing, in which.

In the drawing, corresponding parts are referenced throughout by similar numerals.

DESCRIPTION OF A PREFERRED EMBODIMENT

Figure 1:
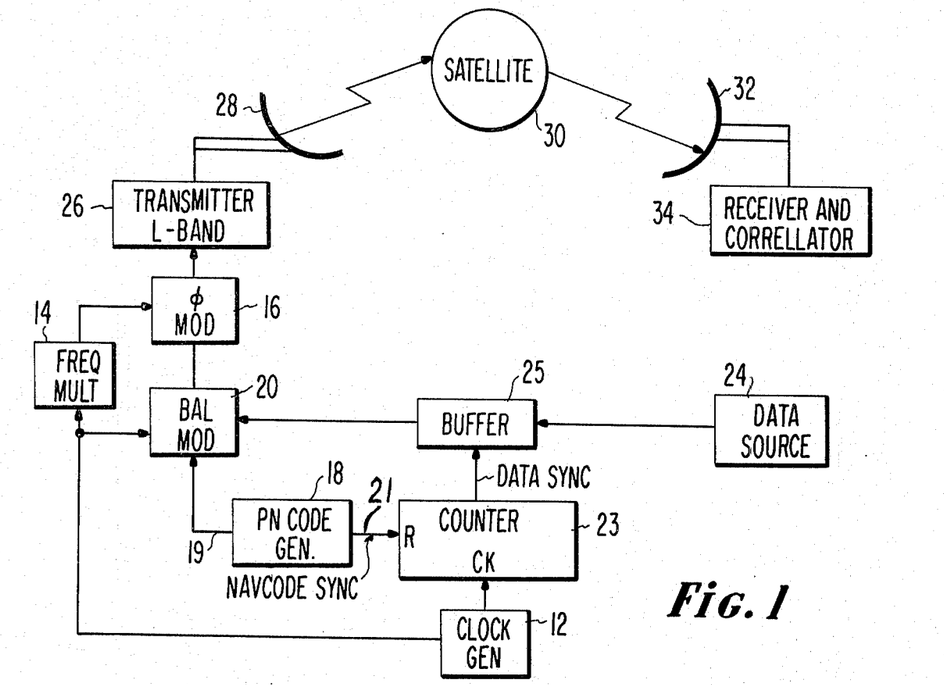
FIG. 1 is a schematic block diagram of a radio navigation and communication system embodying this invention.
Figure 6:
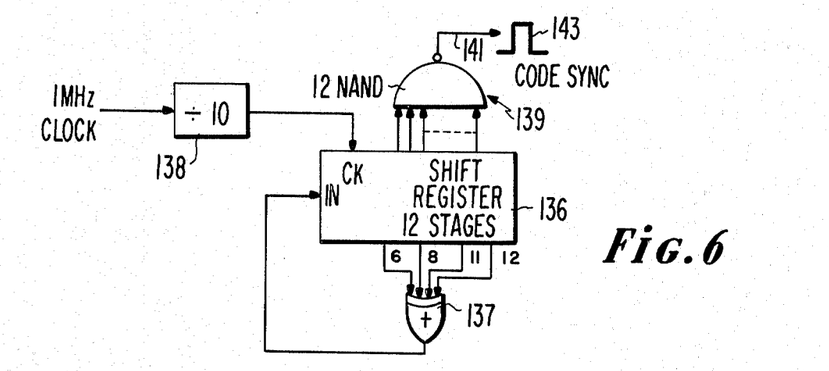
FIG. 6 is a schematic block diagram of a code generator used in the transmitter of FIG. 1 and the receiver of FIG. 2.

In the radio navigation and communication system of FIG. 1, the transmitter section consists of a frequency standard or clock generator 12, which supplies a clock signal (e.g. a square wave or train of rectangular pulse) whose frequency is multiplied in a frequency multiplier 14 to a suitable IF frequency. The waveform (preferably a sine wave) produced thereby is supplied to a phase modulator 16 for modulation by lower frequency signals that are also developed under control of the clock 12. A pseudo-random code generator 18 is used, which may be in the form of a shift register with recirculation from certain stages, as shown in FIG. 6, to produce a maximum length of non-repetitive code of pulses in the form of phase shift keying, which code is repeated periodically. This code generator 18 is driven by the clock and develops the periodic code of pulses that is supplied via line 19 to a balanced modulator 20 where it is combined with the data. The modulation supplied from the balanced modulator is the product of the pseudo-random (PN) navigation code from generator 18 and the data. The balanced modulator may be a modulo-2 adder, which combines the digital signals to produce a binary-0 output when the inputs are different, and a binary-1 output when they are the same.

Figure 5:
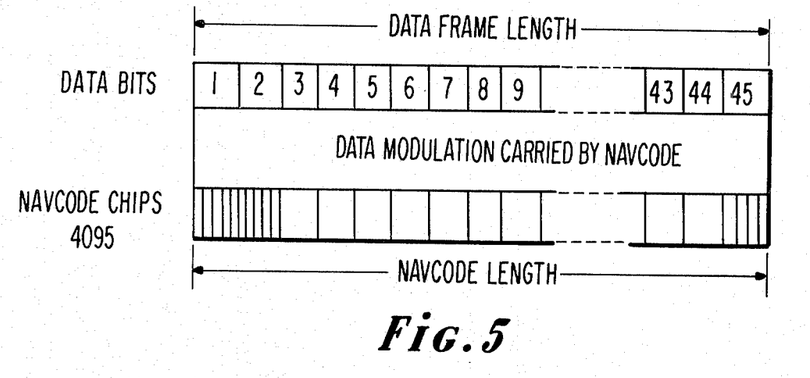
FIG. 5 is an idealized graphical diagram of the relation of the clock, the data bits, and the navigation code.

A data source 24 is also operated under control of the clock 12 and synchronized with the pseudo-random code from generator 18. For example, as shown in FIG. 5, each data word, by way of illustration, is composed of several data bits and the navigation code (navcode) length corresponds to a plurality of such data words. The navcode length (in one form) is 4095 bits or chips long, and 45 data bits form a data frame of the same length as a navcode length. Where the navcode chip rate is 100,000 pulses per second, the data bit rate is approximately 1,100 ps, with 91 chips corresponding to each data bit. The PN navcode and data words are synchronized, for example, by using some initial condition of the PN code (such as all 1's or all 0's) as a navcode sync supplied via line 21 to reset a counter 23 which divides down the clock pulses and directs and times the assembly and transmission of the preset number of data bits forming the data words and frame of data words.

The data stream from source 24 is via a buffer 25 to the balanced modulator under the timing of the data sync signals developed in counter 23 from the clock pulses. The data bits are also added with the PN navcode at the balanced modulator 20, to provide the total modulation supplied to the phase modulator 16. The modulator IF from the phase modulator 16 is heterodyned in a transmitter 26 to L-band frequencies for transmission by way of antenna 28 to a satellite 30, and the transponded signal is received at the antenna 32 of a receiver 34 on a mobile craft such as a ship at sea or an aircraft.

The front end of the receiver (not shown) heterodynes the transmitted signal to a suitable IF frequency by means of a reference clock in the receiver which is substantially identical to that of the transmitter clock 12. The receiver 34 also includes a PN code generator similar to generator 18 in the transmitter, and which operates to produce a corresponding local PN code. Special controls, as explained hereinafter adjust the phase of the local code to that of the incoming navcode received from the satellite.

Figure 2:
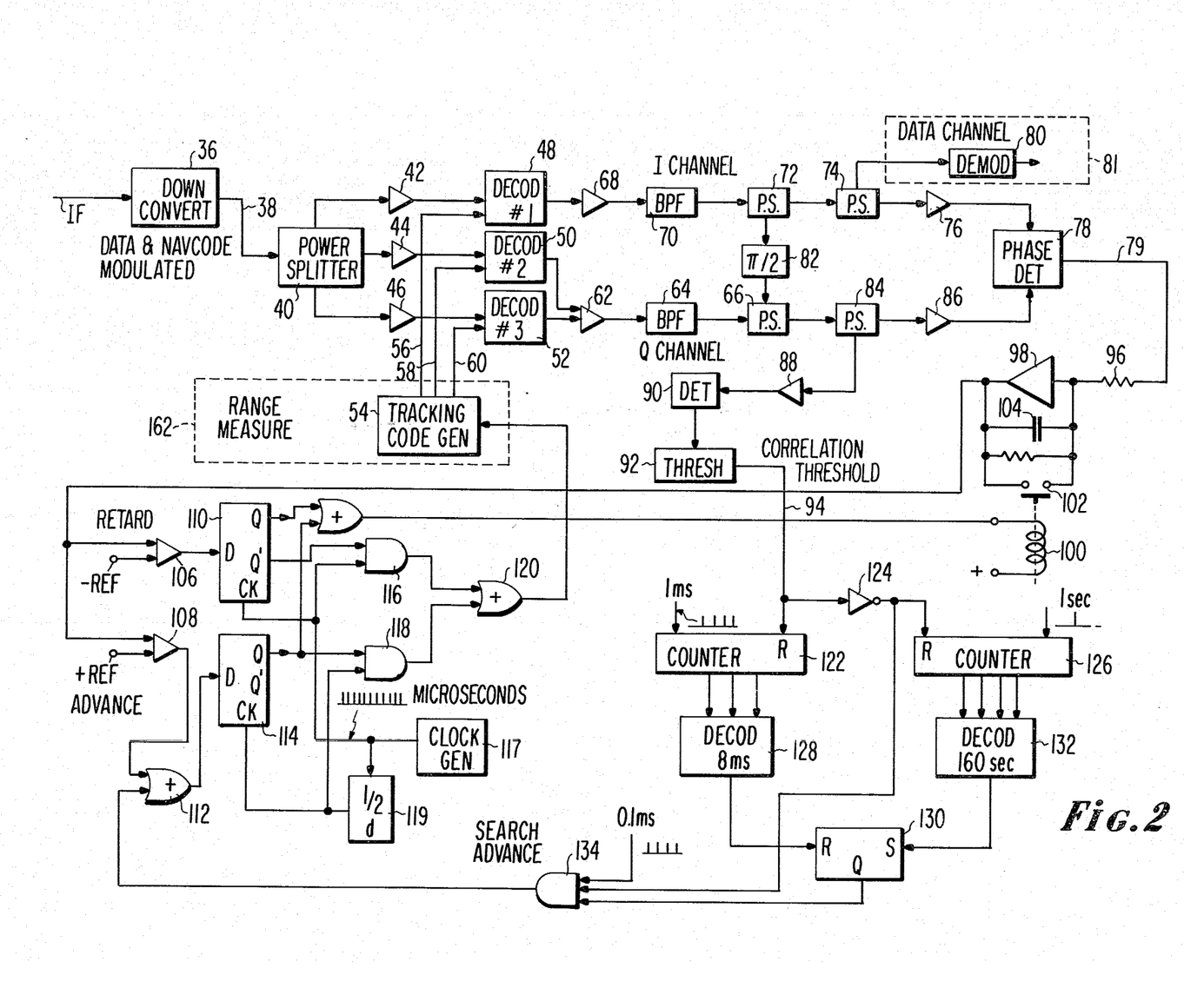
FIG. 2 is a schematic block diagram of a radio navigation and communication receiver and its processor employed in the system of FIG. 1.

The IF signal from the front end of the receiver 34 is supplied to a correlator, details of which are shown in FIG. 2. The IF signal may be nominally a 70.5 MHz signal that may be down converted to 9.0 MHz by down converter 36. The converted signal at terminal 38 contains the transmitted modulation of the PN navcode from generator 18 and the data from source 24. Suitable amplification and filtering, together with suitable automatic gain control, are provided to establish the gain of the system at the terminal 38 of a power splitter 40, which fixes the noise power at a constant level and generally provides an accurate reference for the correlation operations that take place in the correlator portion of the receiver. The down converter, in one form, consists of a mixer that receives the 70 MHz modulated IF signal and produces the 9 MHz signal with the modulation retained. The mixer is connected to a phase lock loop and receives the output of a voltage-controlled oscillator (VCO) therein which is switchable between 61.5 and 61.0 MHz. The loop also includes a frequency divider that also receives the VCO output and supplies the divided-down frequency to a phase comparator that also receives a reference clock at the appropriate frequency. The loop back to the VCO is completed via an amplifier and low pass filter.

Thus, the input to the power splitter 40 is an IF signal which carries the combined modulation of the PN navcode and the data signals. The split is three ways, and the modulated signal is supplied via separate buffer amplifiers 42, 44, 46 to three individual decoders 48, 50, 52. These decoders also receive a local PN code from a tracking code generator 54, and this local code (identical to the transmitted navcode except for phase differences) is supplied in different phase relations on lines 56, 58 and 60 to the three decoders respectively. Decoder No. 1 has the reference code presented to it by line 56, while decoder No. 2 receives the PN code advanced by a ½ code bit, and decoder No. 3 receives the PN code retarded by a ½ code bit with respect to the reference PN code on line 56.

Figure 3:
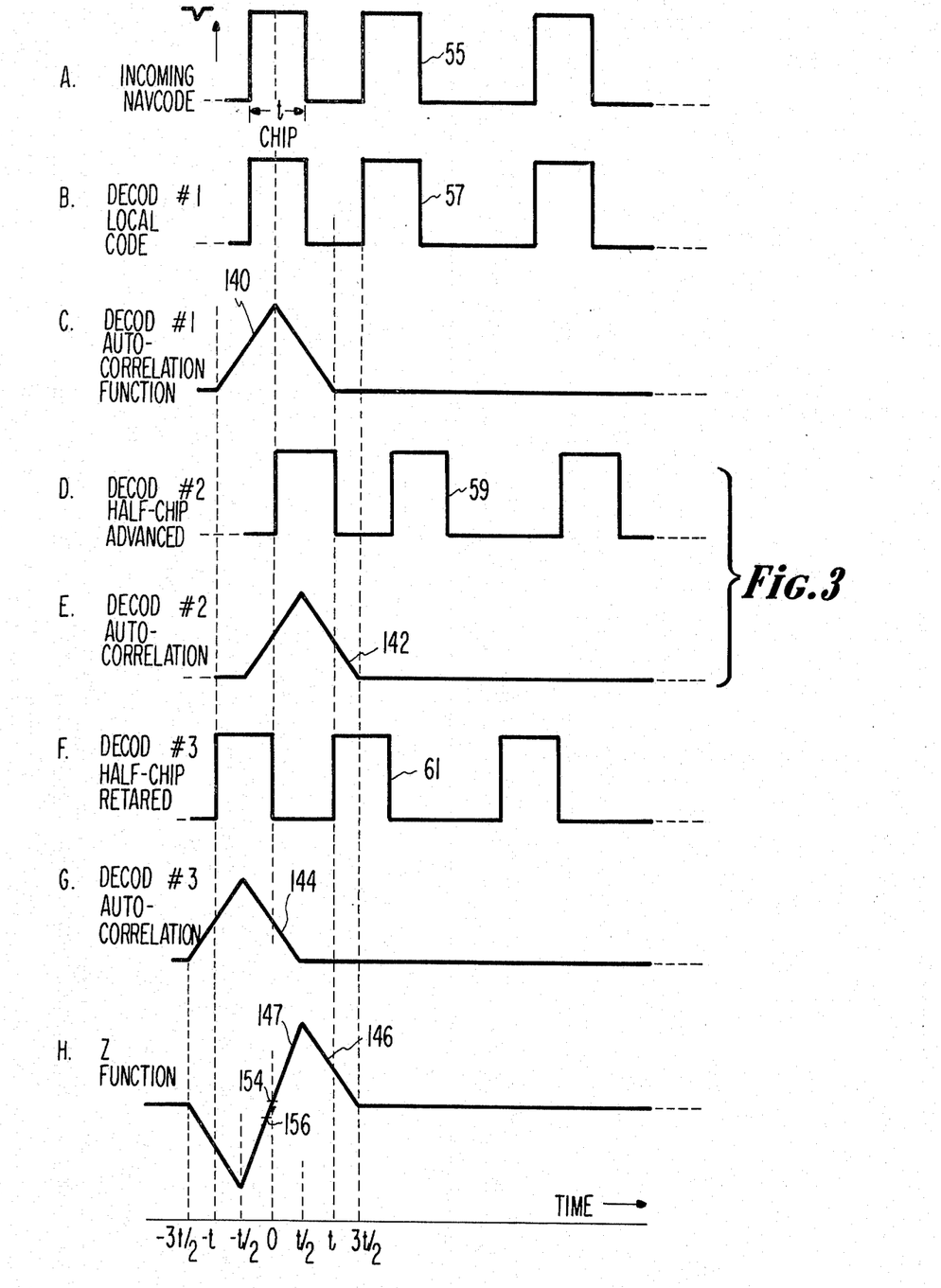
FIG. 3 is an idealized graphical diagram of wave forms and signals occuring in various parts of the receiver of FIG. 2.

The wave forms for these codes are illustrated in FIG. 3, wherein line A represents the incoming navcode 55 of the transmitted modulation, line B represents the reference local code 57 on line 56 supplied to decoder No. 1, line D shows the code 59 on line 58 advanced in phase by a ½ code bit t, and line F shows the code 61 on line 60 retarded by a ½ code bit t with respect to the reference code in line B. The outputs of decoders No. 2 and No. 3 are supplied to a difference amplifier 62, the output of which is the difference between the outputs from these two decoders, and it is supplied to a band pass filter 64, the output of which is supplied to a power combiner 66. The output of decoder No. 1 is supplied to an amplifier 68 similar to amplifier 62, to maintain the signal balance in the two channels. The output from amplifier 62 is supplied by a band pass filter 70 to a power splitter 72 which passes the channel signal to another power splitter 74. The latter passes the channel signal via limiting amplifier 76 to a phase detector 78. The other split signal component from power splitter 74 is supplied to the data demodulator 80 in a communication channel 81. The other split signal component from power splitter 72 is passed by 90° phase shifter 82 to the power combiner 66 in the other channel, which also receives the difference signal developed in that channel. The output of combiner 66 is the sum of the signal developed in the phase-displaced channel and the quadrature signal split from the reference channel. This combined signal is supplied to a power splitter 84 which passes the signal to a limiting amplifier 86 (similar to amplifier 76), the output of which is supplied to the other input terminal of phase detector 78. The other split component from splitter 84 is passed to another limiting amplifier 88, the output of which is detected in detector 90, and the output of the latter is supplied to a threshold detector 92 which supplies the correlation threshold signal on line 94. This correlation threshold is a binary signal, as explained hereinafter.

Figure 4:
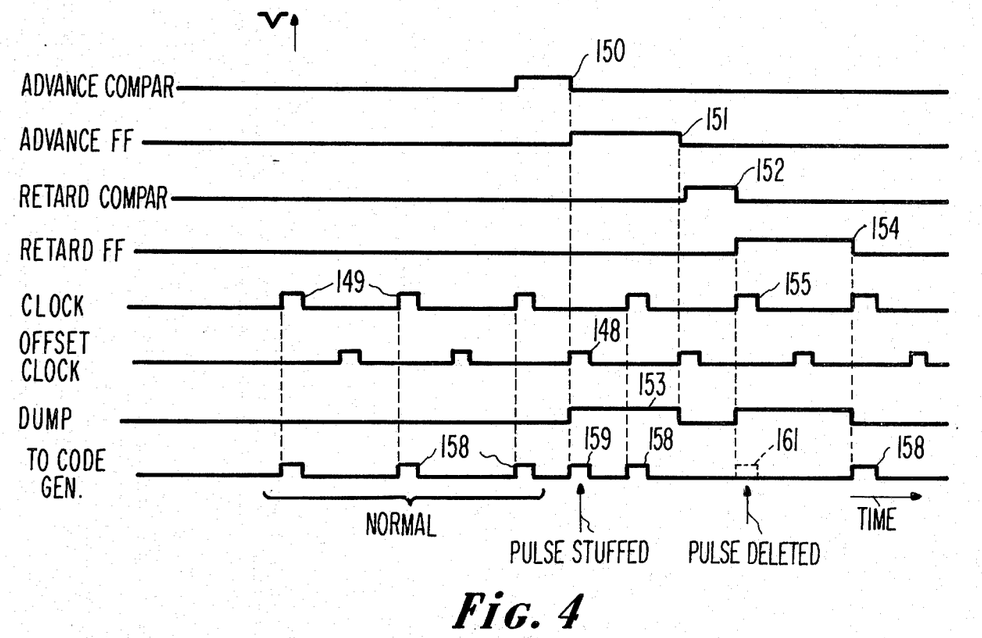
FIG. 4 is an idealized graphical diagram of wave forms occurring in the control portion of the receiver of FIG. 2.

The output of phase detector 78 developed on line 79 is passed by resistor 96 to an amplifier 98 which has an integrator capacitor 104 and a dump control switch 102 connected across it. The dump control includes a relay 100 (which is preferably solid state) which, when energized, shorts the switch terminals 102 connected across the amplifier 98 and across the integrating capacitor 104. The output of integrator amplifier 98 tends to be a sawtooth voltage which is positive- or negative- going from a zero base line after the dump switch 102 reopens, and that sawtooth voltage is supplied to two comparator amplifiers 106 and 108, which respectively receive a negative RETARD reference or threshold voltage and a positive ADVANCE threshold voltage. The output of comparator 106 is supplied to the data input D of a RETARD flip-flop 110, and the output of the ADVANCE comparator 108 is supplied via an OR gate 112 to the data input of an ADVANCE flip-flop 114. The normal or Q output of each of these flip-flops is connected to the dump control relay 100 to actuate the said relay upon the setting of either the ADVANCE or RETARD flip-flop. The Q' output of flip-flop 110 is supplied to a gate 116 together with the local clock (which also times the transfer into flip-flop 110). The Q output of flip-flop 114 is supplied to gate 118 together with the local clock offset (which also times flip-flop 114), but this offset clock is delayed a ½ bit via delay 119, as shown in FIG. 4, to fall midway between the other clock pulses. The outputs of gates 116 and 118 are passed via an OR gate 120 to the tracking code generator 54 to stuff or delete a pulse in the tracking code generator during the TRACKING mode.

The binary correlation threhold signal on line 94 is supplied to the reset input of a counter 122, which also receives clock pulses at a 1-millisecond rate. This correlation threhold signal is also supplied via an inverter 124 to another counter 126 which receives a different clock pulse of a 1-second repetition rate. The output of counter 122 is monitored by a decoder 128 to reset a flip-flop 130 upon a count of 8 corresponding to 8-milliseconds after the resetting of counter 122 by a correlation threshold signal corresponding to the absence of correlation threshold. A decoder 132 monitors the output of counter 126 and sets flip-flop 130 upon a 160 count corresponding to 160 seconds, or 2⅔ minutes after counter reset corresonding to the presence of correlation threshold. The Q output of flip-flop 130 (together with the absence of correlation threshold) enables gate 134 to pass a 0.1 millisecond clock pulse which is applied via the OR gate 112 for triggering the ADVANCE flip-flop 114 in the SEARCH mode.

The tracking code generator 54 (FIG. 6) consists of a shift register 136 which, in the embodiment for producing the maximum code length of 4095 chips, contains 12 shift stages. The outputs of stages numbered 6, 8, 11 and 12 are recirculated, via OR gate logic 137, to the input. The OR gate logic 137 operates so that if the odd number of its inputs are one bits, then its output is a one-bit which is recirculated to the shift register input. Otherwise the output of the OR logic is a zero-bit which is recirculated. A megabit clock is supplied to a divide-by-10 circuit 138 to produce the shift pulses for the shift register at a 100K pulse per second rate, which is the chip rate of the code generator. A 12-input NAND gate 139 may be used to receive the outputs of the shift register stages, and the output of that gate 139 on line 141 is a pulse 143 identifying an initial condition of the code corresponding to the unique condition of all of them being 1-bits (or 0-bits, if desired). This pulse is used as a sync pulse for synchronization of the data communication channel. The code generator 18 is the transmitter and a reference code generator used in the range measurement are constructed in the same fashion.

The operation of the correlator circuitry of FIG. 2 is as follows: The reference (or I) channel decoder 48 compares the received PN navcode 55 (FIG. 3A) with the locally generated PN tracking code 57 (FIG. 3B) from generator 54. In one form, the navcode length (FIG.5) is 4095 bits (at a 0.1 MHz bit rate), which length is chosen to ensure global navigation coverage without ambiguity. This code is derived in generator 54 by means of a 12-stage shift register fed by a local clock, as shown in FIG. 6, with recirculation from appropriate stages thereof to provide a maximum length of code in accordance with well known procedures. Properties of such maximal length codes that are utilized are as follows: (1) A code sequence multiplied by a shifted replica of itself (a bit or more displaced) is the same code sequence shifted to a further location. (2) The number of bits is $2^m-1$ where $m$ is an integer. (3) The number of positive bits in one length of the periodic sequence exceeds the number of negative bits by exactly one, that is, if a period of the sequence is compared with another, term by term, the number of agreements differs from the number of disagreements by at most one (correlation property).

The decoder 48 performs the autocorrelation of the navcode 55 and the locally generated PN code 57 (i.e., it compares or multiplies those signal functions over the entire period of the periodic code) and develops the autocorrelation signal 140 of FIG. 3C. The peak amplitude of this function 140 represents the conditions of the two codes 53 and 57 being aligned or in phase, the slopes represent the out-of -phase displacement conditions of up to 1 chip retarded or advanced, and the remainder of the graph 140 represents greater phase displacements. If the codes 55 and 57 were moved with respect to each other over their period, function 140 would be generated and repeated over the same period so that, for example, the peak would reoccur at phase alignment.

Figure 11:
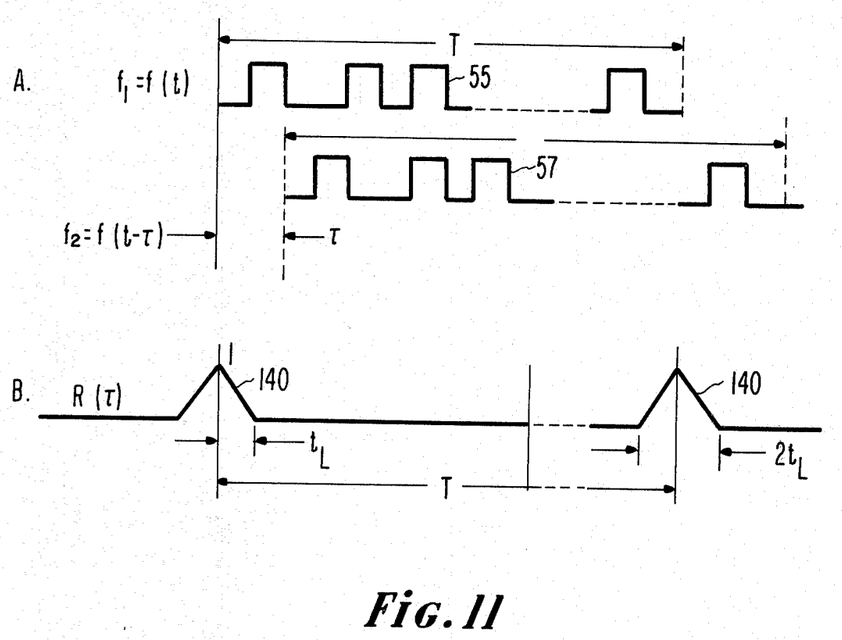
FIG. 11 is an idealized graphical diagram of waveforms and signals occurring in the receiver of FIG. 2.

Decoders 50 and 52 function similarly, except that their respective local code inputs 59 and 61 are phase advanced and retarded by ½ chip as shown is FIGS. 3D and 3F, and their respective outputs 142 and 144 shown in FIGS. 3F and 3G are also correspondingly advanced and retarded by ½ chip from the output 140 of the reference channel decoder 48. The Q position in FIGS. 3B and C relates to the time of phase alignment of the local code 57 to navcode 55. As actually illustrated, FIG. 11A illustrates the condition of the two functions 55 and 57 being out of alignment by, for example, 2 chips of displacement, and FIG. 11B illustrates the repeated generation of the correlation function 140 as, for example, the local code is continuously and uniformly advanced. The peak of the function 142 (or 144) is similarly located in FIG. 3D (or 3E) as though the associated local code 59 (or 61) is at that time in phase alignment with the navcode in its decoding, and the remaining values of the function 142 (or 144) corresonds to the other conditions of relative out-of-alignment.

The power amplifiers 68 and 62 amplify the signals in their respective I and Q channels and, in the phase-displaced channel, amplifier 62 derives the difference between outputs 142 and 144 from decoders 50 and 52. The difference signal takes the form of the Z function 146 of FIG. 3H, which is the difference between functions 142 and 144. The amplitude of the voltage signal 146 in the phase-displaced (or Q) channel is zero when the navcode and local code are in phase or aligned, while the signal voltage 140 in the reference channel is a peak. The amplitude of the latter signal 140 decreases with increased phase displacement to a minimum of $\pm 1$ chip or more displacement. The Z function 146 of the phase-displaced channel has positive and negative peaks at displacements of $+\frac{1}{2}$ chip and $-\frac{1}{2}$ chip, and a steep signal slope therebetween which is used to develop thresholds (as explained hereinafter), for adjustment of the local code phase in a directiion to restore phase lock or alignment to the incoming navcode. Due to the steepness of the center slope, is affords greater precision for achieving phase lock.

The phase detector 78 receives as one input the reference channel autocorrelation signal 140. Its other input is developed by power splitter 66 and quadrature phase shifter 82, together with power summer 66, which combines the phase-displaced autocorrelation signal Q with a quadrature component of the reference channel signal I. The limiting amplifiers 76 and 86 remove any amplitude difference that may exist between the two channels. Thus the amplitude information in the autocorrelation functions 140 and 146 is changed to phase information by the quadrature splitting, combining and limiting.

The phase detector 78 compares the phase relations of its two signals and produces a zero output signal when the inputs are in phase quadrature. This is the condition of the local tracking code being aligned or phase locked to the navcode and the contribution of functiion 146 is zero. However, where there is an out-of-phase relation between the navcode and local code, the Z-function 146 makes a contribution which affects the phase relation of the two-phase detector inputs, namely, the combined signal I+Q and reference-channel signal I. Thus, the output of the phase detector 78 is an amplitude that varies with the Q signal 146, and effectively takes the form of the Z-function 146.

Normally, for the in-phase condition, the output of the phase detector 78 is zero, or close to zero within $\pm 1/10$ (or $\pm 1/20$) of a bit, which are the ADVANCE and RETARD thresholds 154 and 156 on the steep center slope of Z-function 146 (FIG. 3H). Then flip-flop 110 is reset, gate 116 is in its normal enabled condition to pass successive megabit pulses 149 (FIG. 4) from the clock generator 117. These megabit pulses are supplied to the tracking code generator 54, which via its divide-by-10 input circuit 138 reduces the clock rate to the chip rate of 100,000 chips per second, which is the shift pulse rate of that code generator 54. Thus, in-phase operation calls for a train of stepping pulses 158 (FIG. 4) to the code generator 54 for normal shifting thereof to develop the local code.

In the condition of out-of-phase lock, the output voltage from detector 78 is a positive or negative-going voltage which exceeds the threhold and which is integrated, via amplifier 98 capacitor 104, to develop a positive or negative-going sawtooth which varies from a base line established by the dump switch 102 discharging the capacitor. It it is positive-going, the comparator 108 compares that voltage with a positive reference voltage used as the threshold. When that threshold is reached, an ADVANCE signal 150 (FIG. 4) is generated to set 151 ADVANCE flip-flop 114 under timing control of the next succeeding offset clock pulse 148 (supplied at a megacycle rate). The Q output of the flip-flop 114 is used as a DUMP signal 153 to energize the dump relay 100 and terminate the ADVANCE signal 150. This output also enables the gate 118 to pass the offset clock pulse 148. Since the latter is $\frac{1}{2}$-bit offset from the normal megabit clock 148, it can be "stuffed" midway between two normal clock pulse 158. This stuffed pulse is also used to step the tracking code generator 54, and advnaces the stepping of the local code by 1/10 chip.

When the output voltage of detector 78 goes negative beyond the threshold, it is integrated via amplifier-integrator 98, 104 to provide a negative-going sawtooth which, when it exceeds the negative reference supplied to comparator 106, produces a RETARD signal 152 to trigger flip-flop 110 to the set condition 154 as timed by clock pulse 155. The flip-flop's Q output generates the DUMP signal 159 which discharges the integrator capacitor 104 to terminate the RETARD signal 152. Its Q' output inhibits or closes gate 116, which is effective to block the passage of clock pulse 155 and thereby effectively delete the pulse 161 from the train to the tracking generator, and retard its normal stepping by 1/10 chip. Thus, depending on whether the local code is advanced or retarded in phase with respect to the incoming navcode, RETARD or ADVANCE signals 152 or 150 are respectively generated by the correlator operation to produce fine (e.g. 1/10 or 1/20 chip) increments of adjustment to track phase lock within that precision.

The circuit operates in this tracking mode as long as the combined signal split off via splitter 84, amplifier 88 and detector 90 exceeds the threshold of circuit 92 to produce the correlation threshold signal on line 94. This signal is a 1-bit if the local generated code is within $\pm 1$ chip of alignment with the incoming navcode; it is a 0-bit if beyond that. Thus, correlation threshold (i.e. a 1-bit) represents the condition generally of the local code being sufficiently close to alignment with the incoming navcode that the output of the phase detector 78 is along the Z-curve 146. If the system has been in the tracking mode (a condition represented by the flip-flop 130 being reset) and the correlation threshold signal tereminates, the effect is to remove the reset signal from counter 126 so that is proceeds to count the one-second clock pulses supplied thereto. Thus, in the absence of the correlation threshold for 160 seconds, the counter 126 continues its count to that which is recognized by decoder 122, and the latter's output there sets the SEARCH flip-flop 130. Thereupon, gate 134 is enabled to pass a clock at the 100,000 bits-per-second rate, which pulses are passed by OR gate 112 to trigger the ADVANCE flip-flop 114 to initiate the operation of stuffing a pulse and advancing the tracking code generator. The search mode continues in this fashion with the shift register of the tracking code generator being advanced at 1000 chips per second, which corresponds to the approximate response time of the correlator which is about 1 millisecond. In the search mode, it would take the order of about four seconds for the tracking code generator to be advanced to the full length of the 4095-chip navcode.

If the correlation threshold should occur during the search mode, gate 134 is inhibited thereby to terminate the passage of pulses via said gate and terminate the advance operation. If it is a momentary noise condition which produced the threshold signal, upon its termination the search advance continues forward. However, if the correlation threshold continues for 8 milliseconds, the counter, since its reset input is removed, it effective to count over this time period. This time count is recognized by decoder 128 to reset the SEARCH flip-flop 130, which terminates the search advance operation and permits the tracking mode to go forward.

Figure 9:
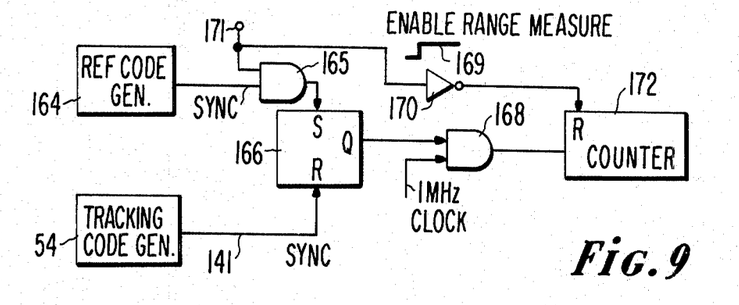
FIG. 9 is a block diagram of the range measuring portion of the receiver of FIG. 2.

The range measuring circuitry 162 operates with the tracking code generator 54 and a reference code generator 164 (FIG. 9) similar to the tracking code generator except that it receives the megacycle clock pulses directly (which are frequency divided down to the chip pulses) but does not receive any stuffed pulses, nor are any deleted by the tracking-mode logic. The difference in count between the tracking code generator and the reference code generator at the chip rate of 100,000 chips per second corresponds to the distance moved by the ship, plane or other vehicle from the reference point to which the reference code generator was preset and remained set without change thereafter. The measurement of this difference is performed with the aid of a flip-flop 166 which is set by the sync pulse 143 (FIG. 6) from the reference code generator 164 via a gate 165 enabled by a sample signal generated at terminal 171 when range measurements are to be performed. This sample signal it utilized by an inverter 170 to reset a measurement counter 172. The flip-flop's Q output enables gate 168, the megaHerz clock is passed by the enabled gate 168 to the input of the counter which counts successive clocks until the flip-flop 166 is reset by the sync pulse 143 of the tracking code generator 54. The count registered in the counter 172 is the difference in phase between the syncs of the two code generators, and thereby a measurement of the range of the vehicle carrying the receiver. This range count may be utilized and displayed in any suitable fashion.

Figure 7:
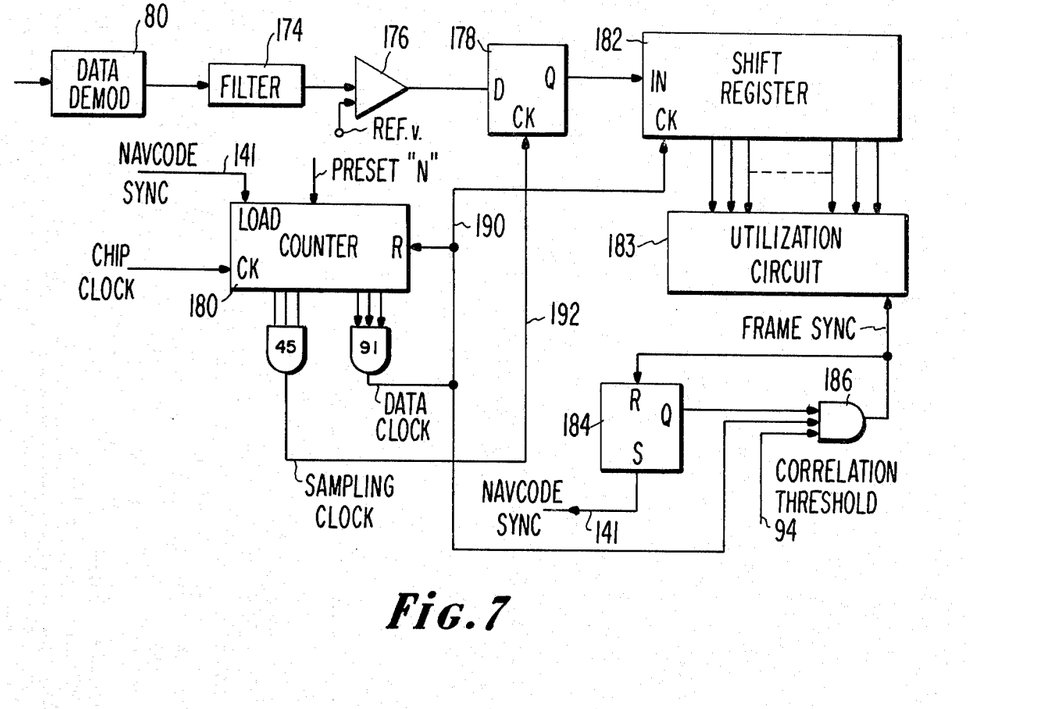
FIG. 7 is a schematic block diagram of a portion of the data communication channel of the receiver of FIG. 2.
Figure 10:
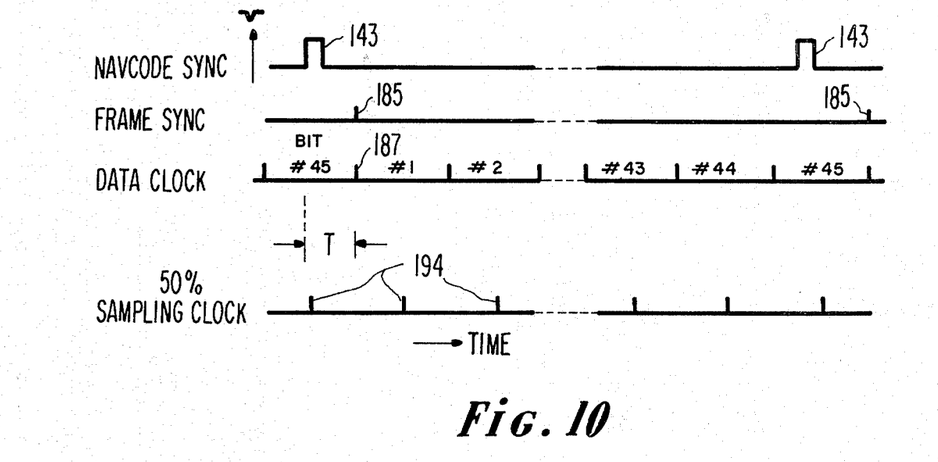
FIG. 10 is an idealized graphical diagram of waveforms occurring in the circuits of FIG. 7.

The data communciation channel 81 is shown in greater detail in FIG. 7. A demodulator 80 receives input signals from the I channel of the correlator, which signals, when in phase lock, include the data modulation and the IF carrier, the navcode having been effectively cancelled by multiplication with the in-phase local code. The demodulator develops a varying voltage, and the output of the data demodulator, after passing through a filter 174, is applied to a threshold gate 176, which compares the voltage with a reference and generates a high or low voltage output when the input is above or below that threshold. The output is supplied to the data input of a flip-flop 178 under control of a sampling clock signal at the data bit rate; the clock is developed by a counter 180 and its phase is chosen to be approximately at the mid-point of the data bit. The Q output of the flip-flop 178 is then applied to a shift register 182 having stages corresponding in number to the number of bits in the data frame, which is the same in length as that of the navcode. The shift register 182 is itself clocked at the data bit rate, and in suitable phase relation to the sampling clock. The transfer from the shift register in parallel to a utilization circuit 183 is under control of a frame sync pulse 185 (FIG. 10) which occurs with the first data clock of each data frame. The frame sync is generated in a circuit consisting of a flip-flop 184 which is set by the navcode sync 143 (FIGS. 6 and 10) whose Q output enables a gate 186 (together with the correlation threshold) to pass a data clock pulse 187 which is used as the frame sync 185 and which is used to reset the flip-flop 184. In the absence of the correlation threshold signal, the frame sync 185 is not generated, and the data develiped in shift register 182 (which data is unreliable since the correlation is not close to phase lock) is not transferred to the utilization circuit 183. Thus, the data channel is effectively disabled in the search mode and enabled during the tracking mode.

The data frame sync and bit sync are directly derived from the navcode sync. At the transmitter end, the first data bit of a frame is modulo-2 added to the first navcode bit at the beginning of the navcode sync pulse 143. The succeeding data bits are then supplied to the modulator at an appropriate rate for modulation with the navcode bits corresponding in time (FIG. 5) in the same fashion. In the illustrative example herein, the data bit rate is 910 microseconds per bit, which corresponds to 91 navcode chips per data bit, and which is a sub-multiple of the code length of 4095 milliseconds, so that the data clock is synchronously related to the navcode sync. At the receiver, the data is present in the modulation in the same relationship to the navcode as when transmitted. However, the data demodulator delays the data to the utilization circuit by an additional delay factor of N microseconds. The counter 180, used to derive the desired data clock pulse for bit synchronizing, is presettable to compensate for this delay factor. The counter 180 receives the navsync pulse 143 which is effective to load the complement of the modulator dalay, the value N, therein. The counter 180 receives a clock at the chip rate, i.e., 100,000 bps. Outputs from the counter corresponding to a count of 91 are supplied to a gate 188, the output of which resets the counter and develops a data clock on line 190 for each count of 91 chips, which clock is the bit sync. In addition, another gate 191 receives the counter ouputs corresponding to each count of 45 to generate on line 192 a sampling pulse 194 at the 50% or mid-point of the bit. To reduce the possibility of noise error, sample clocks at the 40 and 60% points of each bit may also be developed at counts of 36 and 54, respectively, and these sample clocks used to sample the data from the demodulator (in flip-flops similar to flip-flop 178) in addition to the sampling pulses 194 at the 50% point. A majority vote of the contents of all three such flip-flops may then be used to determine the value of the data bit, whether a zero or a one. The preset value N is derived by subtracting from the chip count of 91 chips per data bit the delay of the demodulator in microseconds divided by 10. Thus, as shown in the diagram, the delay T is that occurring from the navcode sync to the first data bit 187, which is also the data frame sync 185. The preset value N is the difference between that delay and the count of 91 chips per data bit. Accordingly, the first data clock occurring after the navcode sync (which condition is obtained by; setting flip-flop 184) is passed by gate 186 as frame sync.

As a consequence of the accurate and precise generation of data frame and data bit synchronization signals with this system, detection of the data modulation can approach that of matched filter operation. By definition, a matched filter is one whose peak response is maximum with respect to average noise output. Thus, in order to achieve such operation with the highest signal-to-noise ratio, it is essential that the signal be sampled at the right time. Optimum sampling is generally achieved at the 50% point with the sampling pulses 194 that are used to clock the flip-flop 178. The latter circuit 178 functions as a sample and hold circuit which results in operation that approaches a 0.5 db matched filter performance.

Figure 8:
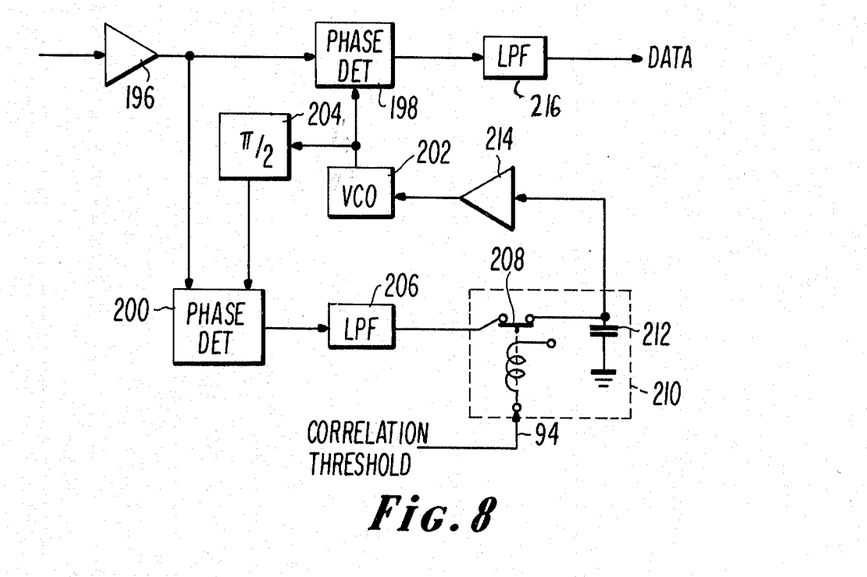
FIG. 8 is a schematic block diagram of a demodulator that may be used in the communication channel of FIG. 5.

The demodulator 80 receives the tapped off data signal which consists of PSK data modulation with the IF carrier but without the navcode modulation except when the correlator is substantially out of phase lock. The demodulator (FIG. 8) includes a limiter 196 which removes amplitude disturbance, the output of which is supplied to a mainstream phase detector 198 and also to a loop phase detector 200. A voltage controlled oscillator (VCO) 202 operating at the IF carrier frequency supplies the carrier to the mainstream detector 198 and, via a 90° phase shifter 204, to the loop phase detector 200. The output of the loop phase detector 200 is an error signal which is filtered via a low pass filter 206 and passed, via the switch 208 of a sample and hold circuit 210 which includes a shunt capacitor 212, to an amplifier 214 the output of which supplies the correction signal to the VCO. The switch 208 (which is preferably electronic) of the sample and hold circuit is closed when the correlation threshold exists, and is open otherwise. Thus, when the correlator is near phase lock, the correlation threshold signal closes the switch 208 so that the phase lock loop of the demodulator is effective to maintain the phase of the VCO close to that of the IF of the data signal. When the correlation threshold does not exist, indicating that the correlation is not near phase lock, the capacitor 212 holds the last correlation voltage of the VCO, and thereby its frequency, until a new valid error voltage is again present when the correlation threshold signal is restored, whereby the loop is maintained in stable condition ready for such restoration. The output of the mainstream phase detector 198 is supplied as the varying data signal, via a low pass filter 216.

The above-described embodiment is illustrative of one form of the invention, and is presented by way of example. Other forms of the invention and modifications thereof will be apparent to those skilled in the art from the above description, as will various circuits known in the art which may be used in the above described system. This system makes use of a sine wave carrier, as well as square wave modulation. It may also be used without a carrier, as well as with other forms of modulation. The system makes use of two transmitted modulations, that of the navcode and that of the data, which may have different frame lengths that are partially concurrent and other phase relations, and other non-integral bit ratios. These two modulations do not interfere with each other and do not adversely affect the operation of the correlation loop, nor do the two make requirements in transmitter power in addition to that required for one of the modulations. No additional requirements of bandwidth are made in order to transmit the data modulation with the navcode, or the navcode with the data. Any other form of periodic modulation (instead of navcode) may be transmitted along with the data, and such other modulation may be used to develop the synchronization signal for the data. Thus, this invention is not limited in its application to navigation systems.

Accordingly, a new and improved system for data communication and navigation measurement is provided, which system also ensures data synchronization. The data is synchronized both as to each frame and as to each bit thereof with high precision and dependability. In addition, this synchronization ensures optimum detection approaching that of a matched filter to obtain very low signal-to-noise ratios and enable synchronization when the local clock is within a chip of the received sound.

Set forth hereinafter are theoretical analyses of the nature of the signals and their magnitude in the correlation system and phase detection using Property No. 3 of maximal length codes:

AUTOCORRELATION

Correlation function:

$$\text{Let } R = \lim_{T' \to \infty} \frac{1}{2T'} \int_{-T'}^{T'} f_1 \cdot f_2 \, dt \qquad (1)$$

where $f_1$ and $f_2$ are normalized functions with 0 mean. See FIG. 11A.

$T = 1 \text{ period} = 2^N - 1 \text{ bits} = L \text{ Bits}$
$\phi = 0 \text{ phase point of code (arbitrary)}$ $$t_L = \text{length of 1 bit} = \frac{T}{2^N - 1}$$

If $f_2$ were slid in time and at each instance $f_2$ were compared (i.e., multiplied) to $f_1$ over the entire period the output would be as shown in FIG. 11B.

$$R(\tau) = \lim_{T' \to \infty} \frac{1}{2T'} \int_{-T'}^{T'} f(t) \cdot f(t - \tau) \, dt \qquad (2)$$

Since $f(t)$ is periodic $$R(\tau) = \frac{1}{T} \int_0^T f(t) \cdot f(t - \tau) \, dt \qquad (3)$$

When $\tau = 0$ $$R(o) = \frac{1}{T} \int_0^T f^2(t) \, dt \qquad (4)$$

$$R(o) = \frac{1}{T} \int_0^T dt = 1 \qquad (5)$$

Since $f^2(t)$ equals 1 because it is a bit by bit product of $+1$ and $+1$ and $-1$ and $-1$ amplitudes.

If $\tau \neq 0$ $$R(\tau) = \frac{1}{T} \int_0^T f(t) f(t - \tau) \, dt \qquad (6)$$

By Property No. 1

$$R(\tau) = \frac{1}{T} \int_0^T f(t + \tau) \, dt \qquad (7)$$

By Property No. 3

$$R(\tau) = \frac{1}{2^N - 1} = \frac{1}{L} \qquad (8)$$

Thus the autocorrelation function has been generated. Equation (8) is an average value of the time sidelobes.

PHASE DETECTOR

The output of a phase detector can be expressed as:
$V_1 V_2 \cos \theta$, where $V_1$ and $V_2$ are the input voltages and $\theta$ the phase angle between them.
Since the amplitudes of both channels are normalized to 1V RMS, the $\cos \theta$ term furnishes the information regarding the phase of the code streams.
Correlator Error Voltage $V_E$:

-continued $$V_E = 1 \times 1 \cos \theta = \cos \theta \quad (2)$$
BW = 50 Hz
Dump But $$I_{amplitude} = 1 - \frac{t}{T} = K \quad \text{(FIG. 3C)} \quad (3)$$

$$Q_{amplitude} = \frac{2t}{T} = A \quad \text{(FIG. 3H)} \quad (4)$$

$$\cos \theta = \frac{\frac{2t}{T}}{\sqrt{\left(1 - \frac{t}{T}\right)^2 + \left(\frac{2t}{T}\right)^2}} \quad (5)$$

From eq. 5 it can be seen that error voltage $V_E$, ($\cos \theta$) it is dependent upon the amplitudes in the $I$ and $Q$ channels which are, in turn, dependent upon the relative positions of the incoming and local codes.

QUAD SPLITTER

After decoding and filtering:

$$I = .K \cos \omega_o t \text{ (ref)} \quad (1)$$

$$Q = A \cos \omega_o t \quad (2)$$

$I$ shifted 90°:

$$I \angle 90° = K \sin \omega_o t \quad (3)$$

Into the summer:

$$Q + I \angle 90° = A \cos \omega_o t + K \sin \omega_o t \quad (4)$$

$$Q + I \angle 90° = A \cos \omega_o t + K \cos (\omega_o t + 90°) \quad (5)$$

Phasor Representation:

eq (3)

$$\theta = \tan^{-1}\left(\frac{K}{A}\right)$$

Into the Limiting Amps:

$$I = K \cos \omega_o t \quad (1)$$

$$I \angle 90° + Q = A \cos \omega_o t + K \cos (\omega_o t + 90°) \quad (5)$$

$$I \angle 90° + Q = \sqrt{K^2 + A^2} \cos (\omega_o t + \theta) \quad (6)$$

The limiting amps saturate at approximately 1 $V$ RMS
Therefore $$I = 1 \cos \omega_o t \quad (7)$$

and $$I + Q = 1 \cos (\omega_o t + \theta) \quad (8)$$

enter the Phase Detector

What is claimed is:

1. Signal correlating apparatus comprising:
a plurality of signal channels, means for supplying received signals to three of said channels and for supplying to said three channels locally generated signals similar to said received signals and supplied to said channels in a certain phase difference relation, separate means in each channel for combining said received and local signals, and means for producing from the combined signals of said three channels a signal having substantially zero amplitude when said locally generated and received signals are in phase and having oppositely directed amplitudes when said locally generated and received signals are in oppositely out-of-phase directions respectively;
means for relating the combined signals in said channels and for generating a control signal in accordance with the relation thereof;
and means responsive to said control signal for modifying the phase of the local signals supplied to said channels.

2. Signal correlating apparatus as recited in claim 1 wherein said means for modifying the phases of the local signals includes means responsive to a substantial magnitude of combined signals in one or the other of said channels for enabling the modifying of phases of the local signals.

3. Signal correlating apparatus as recited in claim 2 wherein said means for modifying the phases of the local signals further includes means for modifying the phases of the local signals in discrete steps and for maintaining the modified phase when the phase modifying is not enabled.

4. Signal correlating apparatus as recited in claim 1, wherein said locally generated signals supplied to two of said channels are equally and oppositely out-of-phase with respect to the phase of said locally generated signals supplied to the third of said channels.

5. Signal correlating apparatus as recited in claim 1, wherein said locally generated signals are rectangular waves.

6. Signal correlating apparatus as recited in claim 5, wherein said locally generated signals are pseudorandom code.

7. Signal correlating apparatus comprising:
a plurality of signal channels, means for supplying to said channels received signals and for supplying to said channels locally generated signals similar to said received signals and supplied to said channels in a certain phase difference relation, and separate means in each channel for combining said received and local signals;
means for relating the combined signals in said channels and for generating a control signal in accordance with the relation thereof;
and means responsive to said control signal for modifying the phase of the local signals supplied to said channels;
said means for relating the combined signals including means for comparing the signals in one channel with the difference between the signals in second and third channels.

* * * * *

UNITED STATES PATENT OFFICE
CERTIFICATE OF CORRECTION

Patent No. 4,004,237  Dated January 18, 1977

Inventor(s) Dale L. Kratzer

It is certified that error appears in the above-identified patent and that said Letters Patent are hereby corrected as shown below:

| | | |
|---|---|---|
| Col. 1, line 42 | after "system" insert --.-- | |
| Col. 2, line 67 | "pulse" should be --pulses-- | |
| Col. 5, line 37 | "threhold" should be --threshold-- | |
| 50 | "corresonding" should be --corresponding-- | |
| Col. 6, line 7 | "is" should be --in-- | |
| 55 | "Q" should be --"O"-- | |
| Col. 7, line 1 | "corresonds" should be --corresponds-- | |
| 21 | "directiion" should be --direction-- | |
| 23 | "is" should be --it-- | |
| 67 | "Threhold" should be --threshold-- | |
| Col. 8, line 3 | "It" should be --If-- | |
| 15 | "pulse" should be --pulses-- | |
| 17 | "advnaces" shoud be --advances-- | |
| 52 | "tereminates" should be --terminates-- | |
| 53 | "is" should be --it-- |

UNITED STATES PATENT OFFICE
CERTIFICATE OF CORRECTION

Patent No. 4,004,237  Dated January 18, 1977

Inventor(s) Dale L. Kratzer

It is certified that error appears in the above-identified patent and that said Letters Patent are hereby corrected as shown below:

| | | |
|---|---|---|
| Col. 9, line 22 | "count" should be --counts-- |
| 55 | before "output" insert --gate-- |
| Col.10, line 8 | "develiped" should be --developed-- |
| 35 | "dalay" should be --delay-- |
| Col.14, line 19 | "phase" should be --phases-- |

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*